No. 803,446. PATENTED OCT. 31, 1905.
I. N. SPAID.
CLAMP FOR BRACING AND CONNECTING TRACK RAIL SECTIONS.
APPLICATION FILED AUG. 17, 1905.
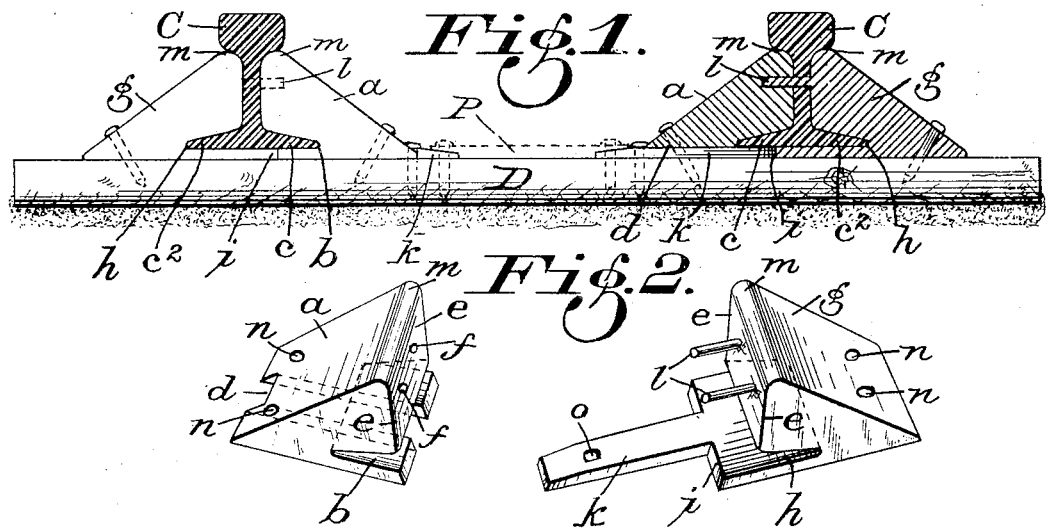
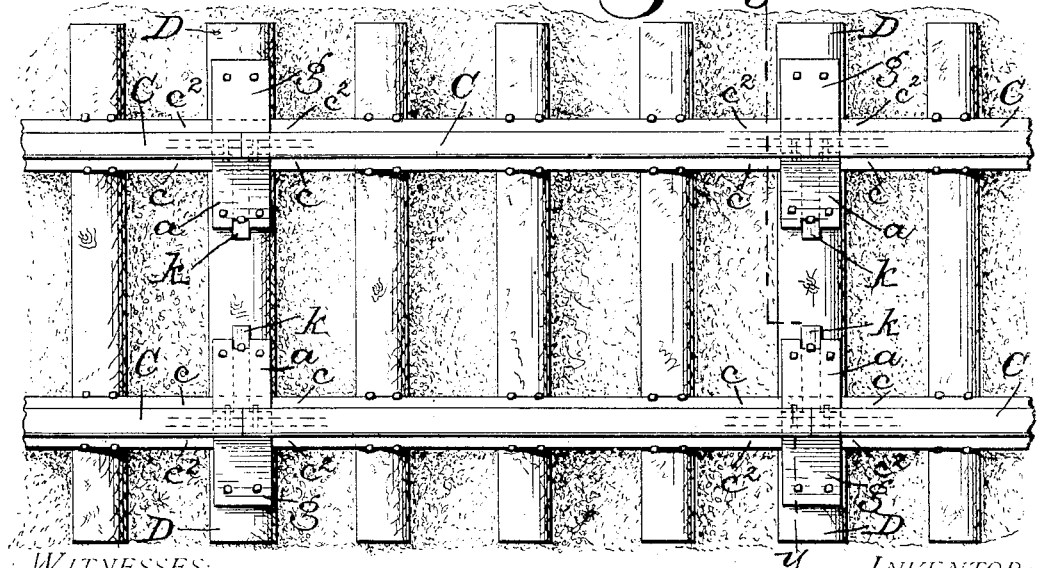
WITNESSES
Bernard B. Ewald.
David H. Spaid.
INVENTOR.
Isaac N. Spaid
BY
Frank M. Burnham,
Attorney

UNITED STATES PATENT OFFICE.

ISAAC N. SPAID, OF WEST CHARLESTON, OHIO.

CLAMP FOR BRACING AND CONNECTING TRACK-RAIL SECTIONS.

No. 803,446.  Specification of Letters Patent.  Patented Oct. 31, 1905.

Application filed August 17, 1905. Serial No. 274,635.

*To all whom it may concern:*

Be it known that I, ISAAC N. SPAID, a citizen of the United States, residing at West Charleston, in the county of Miami and State of Ohio, have invented certain new and useful Improvements in Clamps for Bracing and Connecting Track-Rail Sections; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a clamp for bracing and connecting track-rail sections, or, in other words, a fastening means for securely connecting or joining the abutting ends of the sections or rails comprising a railroad-track, also a means for preventing any lateral movement of said sections or rails.

Some of the principal objects and advantages of this invention consist in producing a device for connecting and retaining the sections of rails of a track for railroads or traction-lines more firmly in position than heretofore, also one which can not alone be quickly and readily attached to all classes of rails in present use, but may also be employed with equal advantage in connecting broken rails, also to produce a device of this nature composed of few parts, simple in construction and necessarily inexpensive in cost of manufacture, and which is very effective in its results, the construction of my device being such as to do away with all costly and expensive "bolts," "fish-plates," and "nut-locks" or like attachments.

My invention consists, essentially, referring in general terms to the construction of my clamp for bracing and connecting track-rail sections, of the inner sectional brace provided with the groove and the openings or cylindrical depressions, the outer sectional brace provided with the tongue and the connecting prongs or pins, and the minor details and the very peculiar and novel construction, arrangement, and combination of these various mechanical parts, as will be hereinafter more fully described in detail, and pointed out in the subjoined claims, in accordance with the statutes in such cases made and provided therefor.

Referring to the accompanying drawings, constituting a formal part of this specification, and wherein the same letters of reference indicate the same parts wherever occurring throughout the several views, Figure 1 is a transverse sectional view of a car-track, taken on line $y\,y$ of Fig. 4, showing the clamp on one side of track in section. Fig. 2 shows perspective views of the inner and outer sectional braces, showing them in position ready to be assembled in laying a track. Fig. 3 is a perspective view of the connecting-bar which may be used, if so desired; and Fig. 4 is a plan view of a portion of a railroad-track with my clamps in position so as to illustrate the practical application of the invention.

In describing my said invention specifically and referring in detail to the various mechanical parts or elements of construction of my clamps for bracing and connecting track-rail sections, $a$ refers to the inner sectional brace, which is to be constructed out of properly-tempered iron or similar material the same as the balance of the clamps and provided with a recess or slot $b$ of the proper size and shape adapted to receive the adjacent flange $c$ of the base of the abutting ends of the sections of rails C, said inner brace $a$ having its base or portion which rests upon the tie D formed with a groove $d$, while its inner face $e$, which bears against the web of the rail, is provided with cylindrical depressions or holes $f$. Outer sectional brace $g$, as fully and clearly illustrated, is provided with a recess or slot $h$, identical with recess $b$, and adapted, like said recess, to receive the adjacent (but opposite) flange $c^2$ of the abutting ends of rail-sections C. Said outer brace $g$ has its base or portion which rests upon the tie or sleeper D extending far enough inward at $i$ so as to meet the base of inner brace $a$ (see Figs. 1 and 2) and is formed with a tongue $k$, which is adapted to rest in and extend somewhat beyond groove $d$ of said inner sectional brace, as shown, there being left only sufficient space between the inner faces or vertical walls $e$ of said inner and outer sectional braces for the web of the rails or rail-sections, which will thus be held firmly therebetween. Said outer sectional brace is further provided on its inner face or vertical wall $e$, which bears against the web of the rails, as just referred to, with connecting prongs or pins $l$, so placed and of the proper number to register with the ordinary bolt holes or eyes for the bolts of nut-locks of fish-plates, with which most all rails are provided, said connecting-prongs being of a length sufficient to permit them after passing through said bolt holes or eyes in the rails or rail-sections, as just referred to, to enter and rest snugly within cylindrical depressions $f$ of inner sectional brace $a$. Both said inner and outer sectional braces are preferably somewhat approximately "wedge-shaped," as shown, and are so shaped at $m$ as to fit tightly under the lower side or portion of the top or ball of the rails and on each side of the web, when said sectional braces are held firmly and securely in position on the tie D by means of large spikes, which are driven through holes or openings $n$ in the two sectional braces adapted to receive them and also through hole $o$ in tongue $k$, and thence enter tie D. Connecting prongs or pins $l$ are intended in practice to be somewhat smaller in circumference than the bolt eyes or openings in rail-sections C for the purpose of allowing for the longitudinal contraction or expansion or running of the rails.

As shown in Fig. 3 and also illustrated by dotted lines in Fig. 1, a connecting-bar P, constructed out of metal similar to the clamp and adapted to lap at each end onto the end of the tongue $k$, which is provided with a hole or opening $p$, adapted to receive a spike which is to be driven therethrough and thence through a similar hole in the end of said tongues (not necessary to be here shown) into tie D, may be employed when so desired for reinforcing the strength of the clamp on roads where there is a great amount of heavy traffic.

It will be obvious that one very important use or purpose for which my clamp may be employed is in connecting parts of a broken rail at the point where the fracture occurs. In this instance all that is necessary after first placing or laying a tie at this point in the customary manner is to simply remove by cutting the connecting prongs or pins $l$ from outer sectional brace $f$, when all that is then necessary is to assemble and adjust the parts in position against the sections of rails, (caused in this instance by the fracture,) thus avoiding all delay of otherwise drilling holes through the web of the rail for said prongs.

It will be observed that in securing my clamps in position on a track only large spikes are used, there being no bolts throughout the entire device. Old rails need not be removed when equipping a track with my clamp, as the connecting prongs or pins are made of sufficient size and distance apart to register with the bolt eyes or holes, which are already placed in the rails when manufactured.

Having now described my clamp for bracing and connecting track-rail sections, what I claim is—

1. In a clamping device for connecting and bracing rails, the combination of the inner sectional brace provided with a groove, and holes or cylindrical depressions, and adapted to receive a flange of the rails; the outer sectional brace provided with a tongue, and pins or prongs, and adapted to receive a flange of the rails; all substantially in the manner and for the purposes described.

2. The combination in a clamp for bracing and connecting track-rail sections, of an inner sectional brace formed with a slot to receive the flange of the rails, and having its base or under side provided with a groove, and also provided with holes or cylindrical depressions; an outer sectional brace formed with a slot to receive the flange of the rails, a tongue adapted to fit in the groove in said inner sectional brace, pins or prongs adapted after passing through the bolt-eyes in the rails, to rest securely in the holes or cylindrical depressions in said inner section; all substantially as described.

3. In a clamp for bracing and connecting track-rail sections, the combination with the rails of the track; of the inner sectional brace, formed with a slot, and having holes or cylindrical depressions in its inner face or wall and a groove across the base; the outer sectional brace, formed with a slot, and having prongs or pins projecting from its inner face or wall, and a tongue projecting from the base; all substantially in the manner and for the purposes described.

In testimony whereof I have affixed my signature in presence of two witnesses.

ISAAC N. SPAID.

Witnesses:
CHARLES W. HOWARD,
BERNARD B. EWALD.